US006985533B2

United States Patent
Attallah et al.

(10) Patent No.: US 6,985,533 B2
(45) Date of Patent: Jan. 10, 2006

(54) METHOD AND APPARATUS FOR REDUCING PEAK TO AVERAGE POWER RATIO IN A MULTI-CARRIER MODULATION COMMUNICATION SYSTEM

(75) Inventors: Samir Attallah, Singapore (SG); K. Abed-Meraim, Paris (FR)

(73) Assignee: Agency for Science, Technology and Research, Singapore (SG)

( * ) Notice: Subject to any disclaimer, the term of this patent is extended or adjusted under 35 U.S.C. 154(b) by 831 days.

(21) Appl. No.: 09/779,200

(22) Filed: Feb. 7, 2001

(65) Prior Publication Data

US 2002/0168013 A1    Nov. 14, 2002

(51) Int. Cl.
*H04K 1/10*    (2006.01)
*H04L 27/28*    (2006.01)

(52) U.S. Cl. ............... 375/260; 375/222; 370/208; 370/210

(58) Field of Classification Search ............... 704/225, 704/226; 375/260, 350, 222, 229, 257, 258, 375/346, 347; 370/203–210
See application file for complete search history.

(56) References Cited

U.S. PATENT DOCUMENTS

| 5,937,377 A | * | 8/1999 | Hardiman et al. ........... 704/225 |
| 6,081,502 A | * | 6/2000 | Paneth et al. ............... 370/210 |
| 6,130,918 A | * | 10/2000 | Humphrey et al. ......... 375/295 |

* cited by examiner

*Primary Examiner*—Young T. Tse
*Assistant Examiner*—Edith Chang
(74) *Attorney, Agent, or Firm*—Lawrence Y. D. Ho & Assoc.

(57) ABSTRACT

A probability distribution transformer (110) in a multi-carrier modulation (MCM) transmitter (101) receives a MCM signal comprising data packets that represent amplitude values, where the amplitude values are characterized by a Gaussian probability density function. The probability distribution transformer (110), which is provided by a number of piecewise linear transforms, produce a transformed MCM signal comprising transformed data packets which represent transformed amplitude values, where the transformed amplitude values are characterized by a uniform probability density function. When transmitted, the transformed MCM signal results in reduced peak-to-average power ratio (PAPR). In a corresponding MCM receiver (102), a probability distribution inverter (180) inverts the transformation.

35 Claims, 4 Drawing Sheets

METHOD AND APPARATUS FOR REDUCING PEAK TO AVERAGE POWER RATIO IN A MULTI-CARRIER MODULATION COMMUNICATION SYSTEM

FIELD OF THE INVENTION

The present invention relates to multi-carrier modulation communication systems, and more particularly to reducing the peak to average power ratio in a multi-carrier modulation communication system.

BACKGROUND OF THE INVENTION

Multi-carrier modulation (MCM) communication systems are known by a variety of other names including orthogonal frequency division multiplexing (OFDM) and discrete multi-tone (DMT), and MCM has been employed in several applications such as high definition television (HDTV), digital audio broadcasting (DAB) and digital subscriber loop (DSL), systems. An MCM signal is a summation of a significant number of sub-carrier signals. Consequently, as in audio communication, the amplitude of the MCM signal bas a Gaussian distribution, which has a large peak amplitude to average amplitude ratio (PAPR).

Communication systems that use DMT are known to be robust to frequency selective fading and therefore, DMT can be used reliably for high data rate transmissions. However, the high peak amplitudes in a DMT signal can cause several disadvantages. One disadvantage is, the large dynamic range of the DMT signal causes a digital to analog converter in a DMT transmitter to saturate causing the DMT signal to be clipped. Clipping causes severe non-linear distortion to the transmitted DMT signal, which cannot be corrected in a corresponding DMT receiver. In addition, clipping introduces clipping noise that further degrades the transmitted DMT signal.

In order to overcome clipping, the maximum level of the digital to analog converter can be set at a very high value to accommodate the peak values. However, for a fixed transmit power level, an expensive digital to analog converter having a high resolution will be required. Alternatively, the resolution of the digital to analogue converter (DAC) can be reduced to reduce cost. However, this results in a larger step size, which increases quantization noise, thus degrading the transmitted DMT signal.

Another disadvantage is the wide dynamic range imposes the need for a power amplifier with a large dynamic range or back off. Such power amplifiers are expensive and are not power efficient, which limits the use of DMT systems that utilize such power amplifiers to, for example, non-portable applications.

Another method of reducing PAPR disclosed in a publication tided "Understanding Digital Subscriber Line Technology" by T. Starr, J. M. Cioffi and P. J. Silverman, published by Printice-Hall, 1999, teaches tone reduction. Here, a predetermined number of sub-carriers inject symbols that reduce the PAPR of the MCM signal, and an iterative algorithm teaches which symbols are injected. However, to reduce the PAPR significantly, up to 20% of the sub-carriers are required to inject the symbols, leaving fewer sub-carriers for carrying information. In addition, this method is complex as it requires iterative minimization of non-linear functions and computation of several fast Fourier transforms (FFTs).

Other known methods of reducing PAPR revolve around managing clipping, however such methods can themselves cause secondary clipping.

BRIEF SUMMARY OF THE INVENTION

The present invention seeks to provide a method and apparatus for reducing peak to average power ratio in a multi-carrier modulation communication system which overcomes, or at least reduces the abovementioned problems of the prior art.

Accordingly, in one aspect, the present invention provides a peak to average power ratio reducer (PAPR) for a multi-carrier modulation (MCM) communication system comprising:

a MCM transmitter comprising:

a probability distribution transformer having an input for receiving an MCM signal for transmission, the MCM signal comprising a plurality of data packets, wherein the plurality of data packets represent a plurality of amplitude values, wherein the plurality of amplitude values is characterized by a substantially Gaussian probability density function, the probability distribution transformer for transforming the plurality of amplitude values to a plurality of transformed amplitude values in accordance with a probability distribution transform, wherein the plurality of transformed amplitude values is characterized by a substantially uniform probability density function, and the probability distribution transformer having an output for providing a transformed MCM signal comprising a plurality of transformed data packets, wherein the plurality of transformed data packets represent at least some of the plurality of transformed amplitude values; and a MCM receiver comprising:

a probability distribution inverter having an input for receiving a corresponding transformed MCM signal, the probability distribution inverter for transforming the at least some of the plurality of transformed amplitude values to a plurality of inverted amplitude values in accordance with an inverse probability distribution transform, wherein the plurality of inverted amplitude values is characterized by a substantially Gaussian probability density function, and the probability distribution inverter having an output for providing a recovered MCM signal comprising a plurality of inverted data packets, wherein the plurality of inverted data packets represent at least some of the plurality of inverted amplitude values.

In another aspect, the present invention provides a multi-carrier modulation (MCM) transmitter comprising:

a probability distribution transformer having an input for receiving an MCM signal for transmission, the MCM signal comprising a plurality of data packets, wherein the plurality of data packets represent a plurality of amplitude values, wherein the plurality of amplitude values is characterized by a substantially Gaussian probability density function, the probability distribution transformer for transforming the plurality of amplitude values to a plurality of transformed amplitude values in accordance with a probability distribution transform, wherein the plurality of transformed amplitude values is characterized by a substantially uniform probability density function, and the probability distribution transformer having an output for providing a transformed MCM signal comprising a plurality of transformed data packets, wherein the plurality of transformed data packets represent at least some of the plurality of transformed amplitude values.

In yet another aspect, the present invention provides a multi-carrier modulation (MCM) receiver comprising:

a probability distribution inverter having an input for receiving a transformed MCM signal, wherein the transformed MCM signal comprises a plurality of transformed data packets, wherein the plurality of data packets represent transformed amplitude values, and wherein the plurality of transformed amplitude values is characterized by a as substantially uniform probability density function, the probability distribution inverter for transforming at least some of the plurality of transformed amplitude values to a plurality of inverted amplitude values in accordance with an inverse probability distribution transform, wherein the plurality of inverted amplitude values is characterized by a substantially Gaussian probability density function, and the probability distribution inverter having an output for providing a recovered MCM signal comprising a plurality of inverted data packets, wherein the plurality of inverted data packets represent at least some of the plurality of inverted amplitude values.

In still another aspect, the present invention provides a method for peak to average power ratio reduction in a multi-carrier modulation (MCM) communication system comprising:

a) receiving a MCM signal for transmission, wherein the MCM signal comprises a plurality of data packets, wherein the plurality of data packets represent a plurality of amplitude values, and wherein the plurality of amplitude values is characterized by a substantially Gaussian probability density function;

b) transforming the plurality of amplitude values to a plurality of transformed amplitude values in accordance with a probability distribution transform, wherein the plurality of transformed amplitude values is characterized by a substantially uniform probability density function;

c) providing a transformed signal, wherein the transformed signal comprises a plurality of transformed data packets, wherein the plurality of transformed data packets represent at least some of the plurality of transformed amplitude values;

d) transmitting the transformed signal on a communication channel of the communication system;

e) receiving the transformed signal on the communication channel;

f) transforming the at least some of the plurality of transformed amplitude values to a plurality of inverted amplitude values in accordance with an inverse probability distribution transform, wherein the plurality of inverted amplitude values is characterized by a substantially Gaussian distribution; and g) providing an inverted signal, wherein the inverted signal comprises a plurality of inverted data packets, wherein the plurality of inverted data packets represent some of the plurality of inverted amplitude values.

BRIEF DESCRIPTION OF THE DRAWINGS

An embodiment of the present invention will now be more fully described, by way of example, with reference to the drawings of which.

DETAILED DESCRIPTION OF THE DRAWINGS

The present invention, as will be described below, is a probability distribution transformer in a MCM transmitter that transforms a Gaussian MCM signal to a transformed MCM signal having a uniform probability density function prior to transmission, and a probability distribution inverter in a MCM receiver that inverts a received MCM signal having the uniform probability density function to an inverted MCM signal having a Gaussian probability density function. Therefore, the transmitted MCM signal has a uniform probability density function, which does not have a wide PAPR, and can be transmitted without the need for expensive digital to analog converters or power amplifiers with a large back-off. In addition, a cyclic prefix added to the MCM signal at the transmitter, allows a novel equalizer in the MCM receiver to compensate the received MCM signal for transmission characteristics of the communication channel between the MCM transmitter and the MCM receiver.

Figure 1:
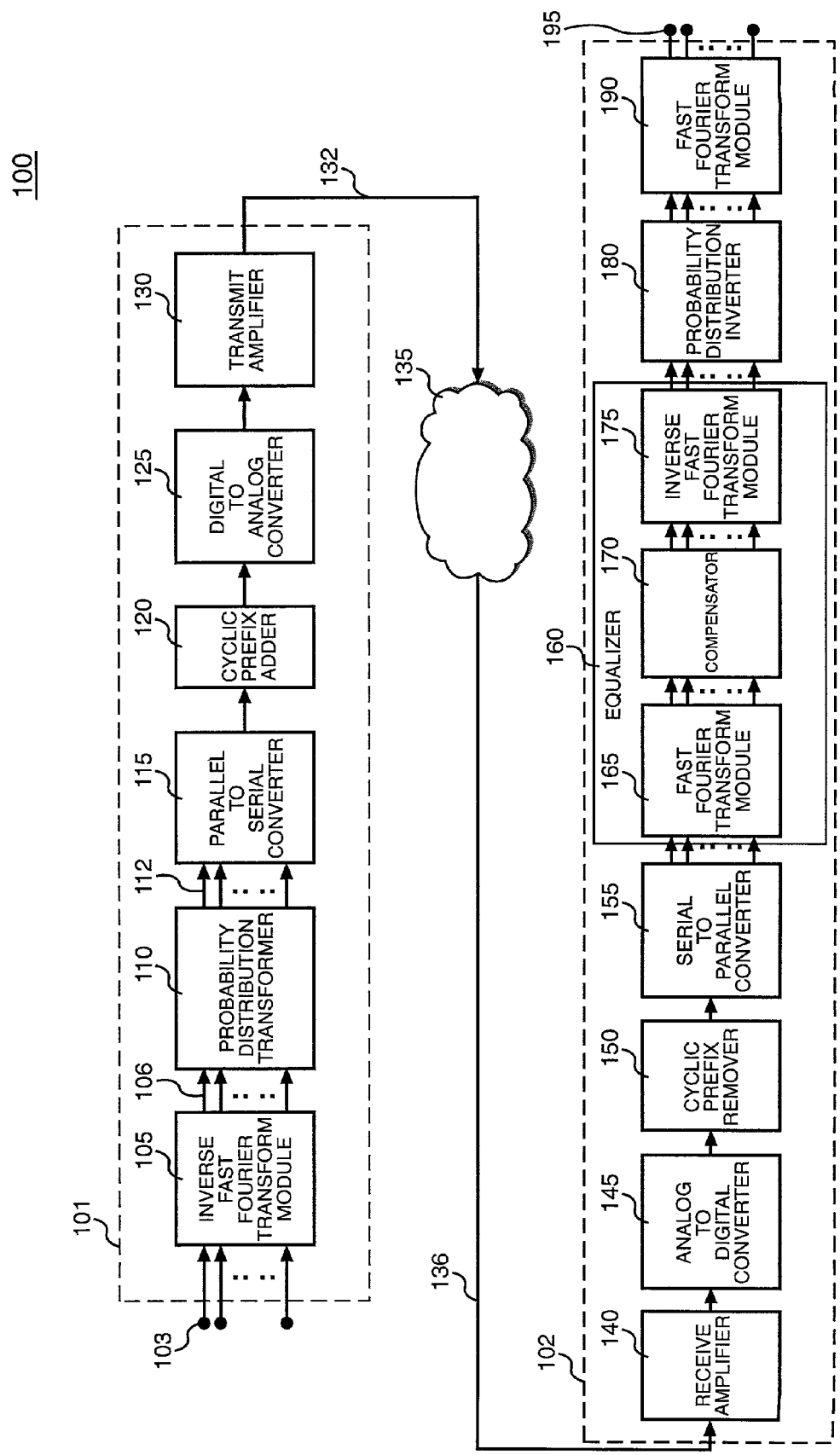
FIG. 1 shows a MCM communication system in accordance with the present invention.

In FIG. 1 a MCM communication system 100 includes a transmitter 101 and a receiver 102. The transmitter 101 receives a signal for transmission at parallel inputs 103 which is coupled to an inverse fast Fourier transform (IFFT) module 105. The MCM communication system 100 is a digital communication system and the received signal for transmission comprises a number of data packets. The inverse FFT module 105 functions as a modulator and modulates the data packets on a number of sub-carriers, and provides modulated data packets on the sub-carriers at parallel outputs 106. The modulated data packets on the sub-carriers constitute a MCM signal, which is provided to a probability distribution transformer 110. As is known in the art, the data packets represent amplitude values, and the amplitude values of the modulated data packets halve a Gaussian probability density function characteristic. The probability distribution transformer 110 transforms the amplitude values of the modulated data packets to transformed data packets with transformed amplitude values, where the transformed amplitude values have a uniform probability density function characteristic. The probability distribution transformer 110 provides the transformed data packet at parallel output 112.

A parallel to serial converter 115 is coupled to receive the transformed data packets and provides a serial data signal comprising serial data packets to a cyclic prefix adder 120, that adds predetermined data to the serial data packets to produce prefixed data packets. A digital to analog converter 125 receives the prefixed data packets, and converts the data packets to an analog MCM signal. The analog MCM signal is then transmitted by the power amplifier 130 via a wired connection 132, such as a telephone line, to a communication network 135, such as a public switched telephone network (PSTN).

The MCM receiver 102 has an input coupled to the PSTN 135 via a wired connection 136, and a corresponding analog MCM signal is received at the input. The received analog MCM signal is shaped by the transmission characteristics of the PSTN 135, and the wired connections 132 and 136, which collectively form a communication channel between the MCM transmitter 101 and the MCM receiver 102.

A receive amplifier 140 amplifies the received analog MCM signal and provides an amplified analog signal to an analog to digital converter 145. In response, serial data packets from the analog to digital converter 145 are provided to a cyclic prefix remover 150, that removes the cyclic prefix from the serial data packets, and provides the resultant data packets to a serial to parallel converter 155.

Parallel data packets from the serial to parallel converter 155 are then equalized by the equalizer 160, and the equalized data packets provided to a probability distribution inverter 180. At the probability distribution inverter, the amplitude values of the equalized data packets are inverted by an inverse probability distribution function, and inverted data packets are provided to a fast Fourier transform (FFT) module 190.

The FFT module 190 demodulates the inverted data packets and produces data packets at output 195, where the data packets substantially represent the data at the input 103 of the MCM transmitter 101.

The equalizer 160 comprises a fast Fourier transform module 165 that receives the parallel data packets from the serial to parallel converter 155, and provides the parallel data packets to a compensator 170. The compensator 170 compensates amplitude values, represented by the parallel data packets, for the transmission characteristics of the communication channel. Where the amplitude values of the data packets represent data samples, the compensator 170 rescales the samples by a complex value that is estimated from the gains of the communication channel. The compensator 170 provides compensated data packets, to an inverse fast Fourier transform module 175 which processes the amplitude values of the compensated data packet to produce the equalized data packets.

Together with the cyclic prefix adder 120, the equalizer 160 advantageously equalizes a received signal for transmission characteristics of the communication channel independently of any form of transformation, such as that of the probability distribution transformer 110 and the like, and/or modulation, such as that by the inverse fast Fourier transform module 105 and the like. The equalizer 160 advantageously isolates the equalization of the communication channel from the specific type of modulation and/or specific type of transformation that may be employed. However, whatever the specific type of transformation or modulation employed, a complementary inverse transformer and/or demodulator is required to recover a transmitted signal. Hence, functionally, the probability distribution inverter 180 complements the probability distribution transformer 110, and similarly, the fast Fourier transform module 190 complements the inverse fast Fourier transform 105.

The input signal at the input 103 comprises symbol vectors represented by S(n) at instant n of length N, where Q represents a 2N×2N matrix of the FFT module 105. In DMT, the transmitted MCM signal should be real. Therefore, S(n) is transformed into a 2N long vector, where the transformed vector is X(n). X(n) is such that it is conjugate symmetric and its first N components are equal to the symbols in S(n). X(n) is provided below.

$$X(n) = i\, X^*(2N-n)$$

The DMT transmitted vector is given by the following.

$$x(n) = Q^H X(n)$$

Figure 2A:
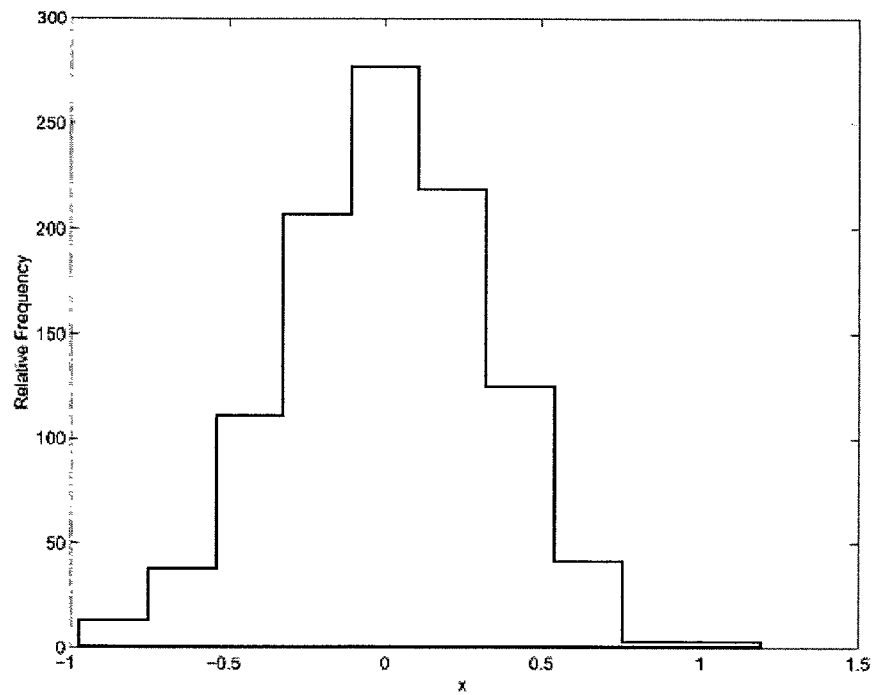
FIG. 2A shows a graph of a probability density function (histogram) of a MCM signal prior to transformation by a probability distribution transformer in the MCM communication system in FIG. 1.

FIG. 2A shows a probability density function of the MCM signal at the input 106 of the probability distribution transformer 110. As is known, when x is a Gaussian random variable with a probability distribution function $F_x(x)$, then the function g(x), such that a random variable y=g(x) is uniform in the range of values or band [0 1] is given by below.

$$g(x) = F_X(x) \tag{1}$$

$$g(x) = \frac{1}{\sqrt{2\pi}\sigma} \int_{-\infty}^{x} e^{-\frac{(z-m)^2}{2\sigma^2}} dz$$

For y to be uniform in the interval $\left[-\frac{1}{2}\ \frac{1}{2}\right]$, $$g(x) = F_X(x) - \frac{1}{2}.$$

This gives $$PARP_y = \frac{\max(y^2)}{E[y^2]} \tag{2}$$

$$= 3 \text{ or } 4.8 \text{ dB}$$

Figure 2B:
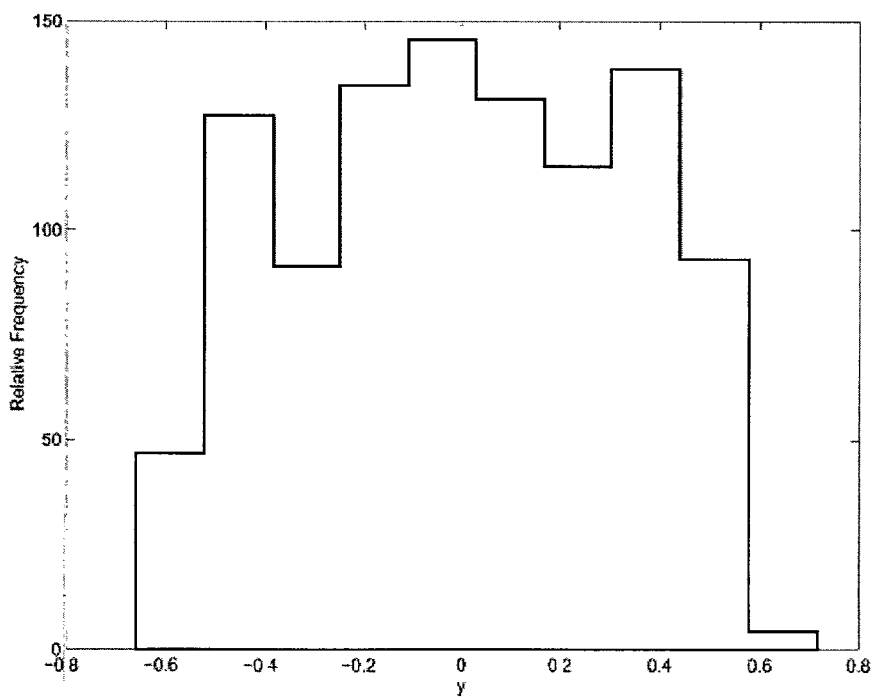
FIG. 2B shows a graph of a probability density function (histogram) of a MCM signal after transformation by the probability distribution transformer in the MCM communication system in FIG. 1.

FIG. 2B shows a probability density function of the MCM signal at the output 112 of the probability distribution transformer 110, of the amplitude values y. From equation (2), $PARP_y$ is bounded whereas $PARP_x$ is not. Now with y having a uniform distribution, an inexpensive digital to analog converter, and an analog to digital converter with a uniform quantizer become optimal for minimizing the average distortion of the signal that is due to quantization. In addition, centering the probability distribution function of y, i.e. that of the PDF transformer 110, no direct current terms are introduced and consequently power is not wasted. However, $F_x(x)$ is a non-linear function which can be computed only numerically, therefore an approximation by a set of piecewise linear functions are employed. The piecewise linear functions are implemented by a number of linear transformers, where each linear transformer operates on a predetermined band of amplitude values.

A practical implementation of the probability distribution transformer 110 using the approximation by a set of piecewise linear functions will now be described.

Figure 2C:
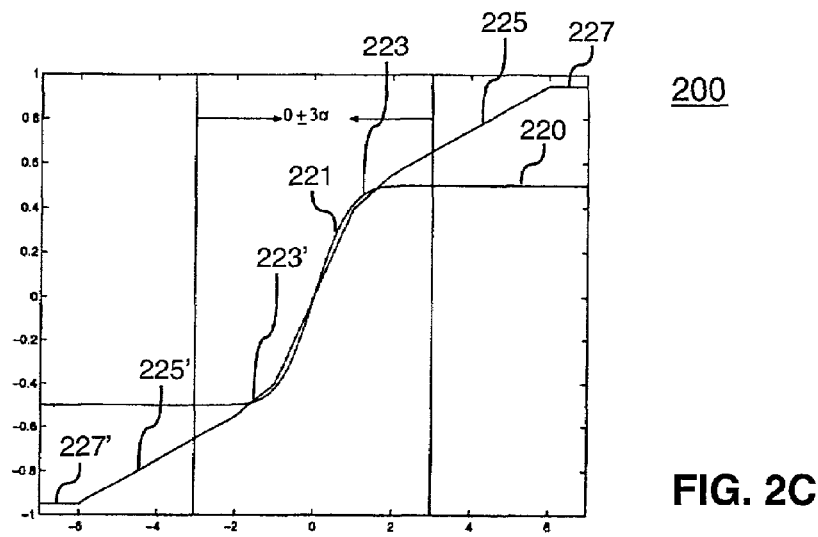
FIG. 2C shows a graph of the characteristic of the probability distribution transformer in the MCM communication system in FIG. 1.

FIG. 2C shows a probability distribution transform characteristic of the non-linear function $F_x(x)$ 220, and seven piecewise linear functions represented by separate portions 221, 223, 225, 227, when x is positive and 223', 225' and 227' when x is negative. These linear functions are applied in accordance with the relative amplitude values of the modulated data packets received at the input of the probability distribution transformer 110, and in accordance with standard deviation σ criteria of the Gaussian distribution of the amplitude values of the modulated data packets. The seven piecewise linear functions and the corresponding standard deviation criteria follows, where the mean of x is zero.

$$y = \begin{cases} (0.4/\sigma)x; & |x| \le \sigma \\ (0.15/\sigma)x + 0.25; & \sigma < x \le 2\sigma \\ (0.15/\sigma)x - 0.25; & -2\sigma \le x < -\sigma \\ 0.1/\sigma)x + 0.35; & 2\sigma < x \le 6\sigma \\ (0.1/\sigma)x - 0.35; & -6\sigma \le x < -2\sigma \\ 0.95; & x > 6\sigma \\ -0.95; & x < -6\sigma \end{cases} \quad (3)$$

The piecewise linear functions have low computational complexity and can advantageously be implemented in software and/or hardware. The choice of physical implementation is left to a designer, and due the relatively simple task for handling linear equations, a choice may result in software, hardware or a combination of both, dependent on particular overall design constraints.

It will be appreciated by one skilled in the art, that the approximation with the seven piecewise linear functions 221, 223, 225, 227, 223', 225' and 227' approximates the non-linear function 220, however, the linear functions 221, 223, 225,227,223', 225' and 227' are a relatively good approximation for x ∈ [−3σ+3σ]. Consequently, the $PAPR_y$ is reduced relative to $PAPR_x$.

When the mean of x is not zero, then the non-zero mean of x is removed before applying equation (3). The non-zero mean of x is then sent to the receiver, where it is used to recover the transmitted signal.

Relative to the characteristic of the non-linear function 220, the characteristics of the seven piecewise linear functions 221, 223, 225, 227, 223', 225' and 227' have larger slopes, which advantageously avoids severe noise enhancement at a receiver, as will be apparent from characteristics of the probability distribution inverter 180 in the MCM receiver 102.

From the characteristics of the seven piecewise linear functions 221, 223, 225, 227, 223', 225' and 227', clipping will tend to occur rarely since the clipping threshold is set to $A_{clip}$=6σ ( i.e. the amplitude value of a modulated data packet at which clipping occurs. The signal to clip noise ratio SNR clip, is given by the following equation.

$$SNR_{clip} = 10\log_{10}[(1 + \mu^2)]\text{erfc}\left(\frac{\mu}{\sqrt{2}}\right) - \sqrt{\frac{2}{\pi}}\mu e^{-\left(\frac{\mu^2}{2}\right)} \quad (4)$$

where $\mu = A_{clip}/\sigma$, then the $SNR_{clip}$ is more than 100 decibels (dB). Hence, the present invention, as described, advantageously reduces clipping to a negligible level.

The actual $PAPR_y$ will now be determined. From earlier equation (3), $PARP_y$ can be computed with the observation that $\max[y^2] = (0.95)^2 \approx 0.9$, then, $$E[y^2] = \int_{-\infty}^{+\infty} y^2 p_x(x) dx \quad (5)$$

$$= 2\sum_{i=0}^{3}\left(\int_{c_i}^{c_{i+1}} (a_i x + b_i)^2 p_x(x) dx\right)$$

$$= 2\sum_{i=0}^{3}\left(\int_{c_i}^{c_{i+1}}\left(a_i^2 x^2 p_x(x) dx - \frac{2a_i b_i \sigma}{\sqrt{2\pi}}\left[e^{\frac{-c_{i+1}^2}{2\sigma^2}} - e^{\frac{-c_i^2}{2\sigma^2}}\right]\right.\right. +$$

$$\left.\left.\frac{b_i^2}{2}\left[\text{erf}\left(\frac{c_{i+1}}{\sqrt{2}\,\sigma}\right) - \text{erf}\left(\frac{c_i}{\sqrt{2}\,\sigma}\right)\right]\right]$$

where $\text{erf}(x) = \frac{2}{\sqrt{\pi}}\int_0^x e^{-t^2} dt$ and where the vectors a=(1/σ)×[0.4 0.15 0.1 0 $]^T$, b=[0 0.25 0.35 0.95$]^T$ and c=σ×[0 1 2 6∞$]^T$ contain the a, 's, b, 's, and $C_i$'s values. The first integral of equation (5) can be evaluated using high precision numerical methods, such as Simpson's rule with midpoint. It can then be found that $PARP_y$ is approximately 5.7 dB; within 1 dB of the theoretical value of 4.8 dB. Then, by performing Monte-Carlo simulations, where N=64, with 64 QAM modulation, the average value of the $PARP_y$ is 5.8 dB. Selecting the coefficients of a and c, as for equation (5) above, it can be shown that $PARP_y$ is constant, and independent of variations in the power $\sigma^2$ of x.

Therefore, the present invention, as described, advantageously provides a MCM signal for transmission that has a PAPR that is substantially independent of the power level of the input signal.

Figure 3C:
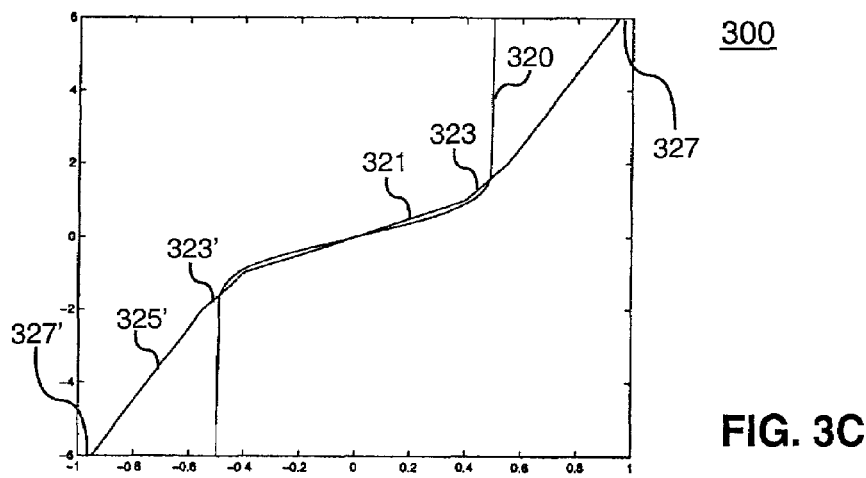
FIG. 3C shows a graph of the characteristic of the probability distribution inverter in the MCM communication system in FIG. 1.
Figure 3A:
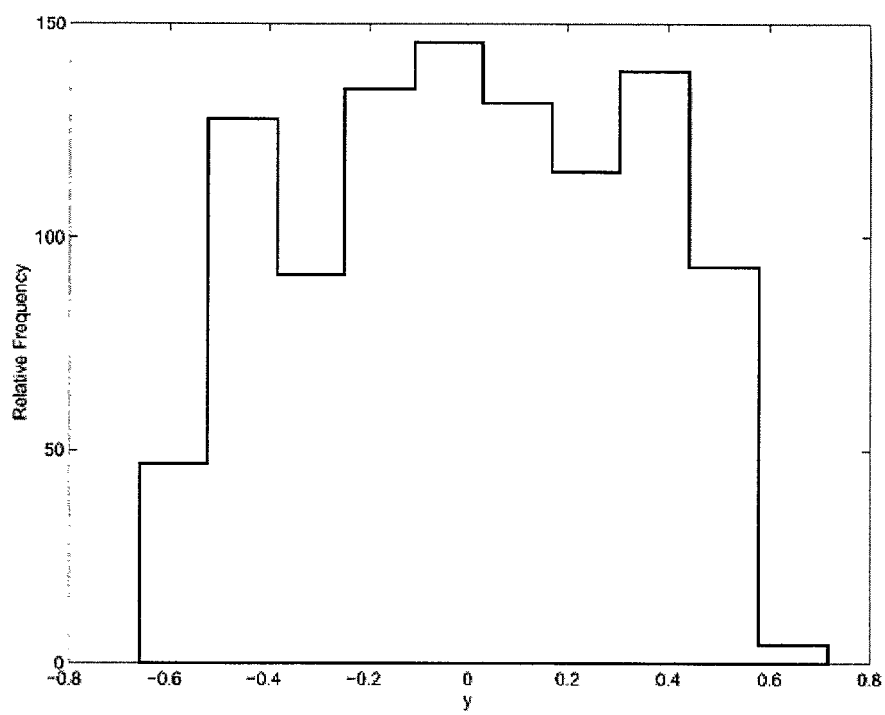
FIG. 3A shows a graph of a probability density function (histogram) of a MCM signal prior to inversion by a probability distribution inverter in the MCM communication system in FIG. 1.

Turning now to the MCM receiver 102, FIG. 3A shows the uniform probability density function of the amplitude of the equalized data packets that are provided to the probability distribution inverter 180.

Figure 3B:
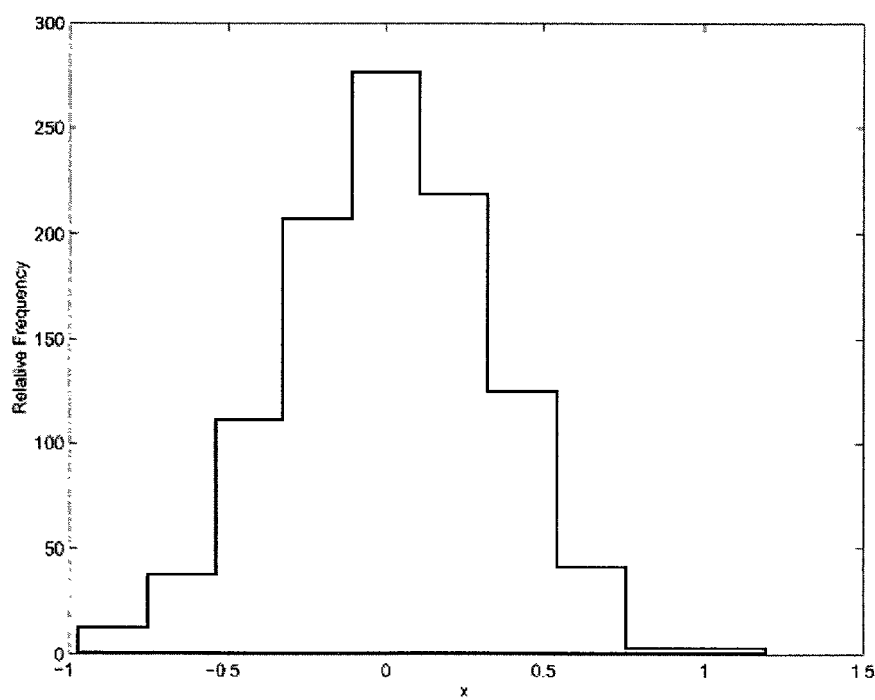
FIG. 3B shows a graph of a probability density function (histogram) of a MCM signal after inversion by the probability distribution inverter in the MCM communication system in FIG. 1.

FIG. 3B shows the Gaussian probability density function of the amplitude of the inverted data packets after inversion by the inverse probability distribution function of the probability distribution inverter 180.

FIG. 3C shows the characteristics of the probability distribution inverter 180 which comprise seven piecewise linear functions 321, 323, 325, 327, 321', 323' and 325', as provided below, that approximate an inverse function 320 of the non-linear function 220 described earlier. The inverse function 320 is a non-linear function which can be computed only numerically, therefore an approximation by the set of piecewise linear functions 321, 323, 325, 327, 321', 323' and 325' are employed. These piecewise linear functions are implemented by a number of linear transformers, where each linear transformer operates on a predetermined band of transformed amplitude values.

$$s = \begin{cases} (2.5\sigma)y; & |y| \le 0.4 \\ (\sigma/0.15)(y - 0.25); & 0.4 < y \le 0.55 \\ (\sigma/0.15)(y + 0.25); & -0.55 \le y < -0.4 \\ 10\sigma(y - 0.35); & 0.55 < y \le 0.95 \\ 10\sigma(y + 0.35); & -0.95 \le y < -0.55 \\ 6\sigma; & y > 0.95 \\ -6\sigma; & y < -0.95 \end{cases} \quad (6)$$

As before, the seven piecewise linear functions 321, 323, 325, 327, when y is positive, and 323', 325', 327', when y is negative, have low computational complexity and can advantageously be implemented in software and/or hardware.

In one embodiment, the signal received by the MCM receiver 102 at the receive amplifier 140 is as provided below.

$$y_{rx}(n)=Hy(n)+n(n) \qquad (7)$$

where,
y(n) is the transmitted vector;
n(n) is a vector of 2N of Gaussian random variables; and
H is the channel matrix.

Equalization is performed by the equalizer 160 prior to the inversion by the probability density function inverter 180. In a DMT systems inter-symbol interference (ISI) can be removed using cyclic prefix technique, as in ADSL. Consequently, the channel matrix H is circulant, and can therefore be factorized as provided below.

$$H = Q^H \Lambda Q \qquad (8)$$

where Λ is a diagonal matrix which contains 2N complex channel gains η(n) where $$\eta(n) = \sum_{m=0}^{M} h(m) e^{-j\frac{2\pi nm}{2N}} \qquad (9)$$

where h(m) represents the channel impulse response.

In one embodiment, η(n) can be estimated relatively precisely. After equalization we get, $$y_{est} = QH\Lambda^{-1}Qy_{rx}(n) \qquad (10)$$
$$= y(n) + Q^H\Lambda^{-1}Qn(n)$$

Applying equation (6) to equation (10) i.e. the estimation performed by the equalizer, then applying FFT 190, we obtain an estimate of the transmitted symbols X(n).

Hence, the present invention, as described, advantageously allows equalization to be performed using the attractive cyclic prefix. One alternative method is to employ an adaptive equalizer.

Conventional use of non-linear transformation to reduce PARP, typically degrades the orthogonality of the sub-carriers in a MCM modulation system, and introduces spectral distortion. Consequently, the symbol error rate of the MCM communication system may be degraded. However, the present invention, as described, in the absence of channel estimation errors and noise in the equalizer 160, restores the orthogonality of the sub-carriers substantially at the MCM receiver 102, just before detection by using the probability distribution inverter 180.

In ADSL systems, the out of band radiation should be minimized in order to comply with ADSL regulations, and to prevent interference with other existing systems that share a common communication channel. This can be achieved by employing pulse-shaping techniques such as a raised cosine filter with a proper choice of the roll-off parameter. In addition, other filtering techniques, such as windowing, can also be utilized.

Figure 4:
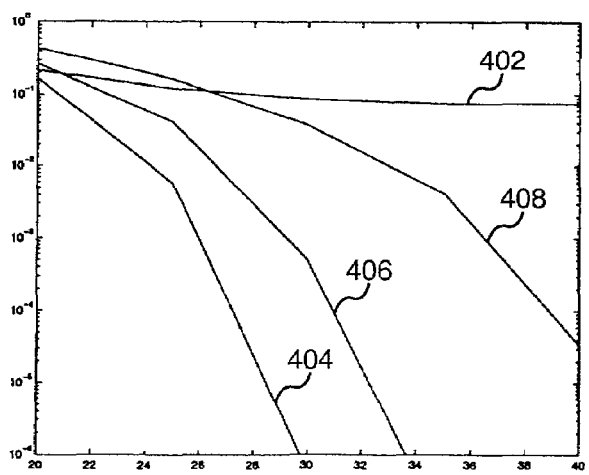
FIG. 4 show a graph of symbol error rates of the communication system in FIG. 1 and conventional communication systems.

FIG. 4 shows simulation results for three channels with N=64 and 64QAM modulation. It is observed that the PAPR reduction, in accordance with the present invention, as described, remains approximately 5.7 dB, while the symbol error rate (SER) for all the channels improve significantly with SNR. Results for an AWGN communication channel of a conventional DMT system which employs clipping to obtain a PARP of 5.7 dB is represented by plot 402. In contrast, plots 404, 406 and 408, in accordance with the present invention as described, show improved SER. Plot 404 represents a AWGN communication channel, and plots 406 and 408 represent a communication channel with mild and severe ISI, respectively. The results are favorable, and seem to be particularly well suited for ADSL applications, where typical SNR values vary from 40 to 60 dB.

It will be appreciated by one skilled in the art, that coding, particularly employed with the present invention, as described, in an ADSL communication system, would provide better performance. Further, in an ADSL communication system, sub-carriers with very low SNR, referred to as bad carriers, are not used for transmission of data, the SER improves significantly This is accomplished using a bit loading algorithm, as in ADSL.

In accordance with the present invention, the probability density function of a MCM signal for transmission is transformed from a Gaussian distribution to uniform distribution with piecewise linear functions of the form y=ax+b. The choice of the constants a and b are governed by two conflicting parameters, PAPRP reduction at the transmitter, and noise enhancement at the receiver. One method of determining optimal values of a and b is by simulation, as shown. However, it will be appreciated by one skilled in the art that while analytical optimal values of a and b, may be derived, it is more important to design a communication system which when realized will have the values of a and b selected to compensate for other errors or parameters in that communication system.

The present invention, as described, reduces PAPR allowing inexpensive digital to analog converters, analog to digital converters, and power amplifiers with low back off to be employed. In addition, SER is kept as low as possible.

This is accomplished by transforming the Gaussian probability distribution of a signal for transmission to a uniform probability distribution prior to transmission thus reducing the PARP of the transmitted signal. Then when a transformed signal having the uniform probability distribution is received, the probability distribution of the transformed signal is inverted to produce a received signal having Gaussian probability distribution, prior to detection. In addition, the use of a cyclic prefix at the transmitter with a corresponding equalizer, in accordance with the present invention, produces an equalized MCM signal that is compensated for characteristics of the communication channel between a MCM transmitter and a MCM receiver.

The present invention therefore provides a method and apparatus for reducing peak to average power ratio in a multi-carrier modulation communication system which overcomes, or at least reduces the abovementioned problems of the prior art.

It will be appreciated that although only one particular embodiment of the invention has been described in detail, various modifications and improvements can be made by a person skilled in the art without departing from the scope of the present invention.

We claim:

1. A peak to average power ratio (PAPR) reducer for a multi-carrier modulation (MCM) communication system comprising:

a MCM transmitter comprising:

a probability distribution transformer having an input for receiving an MCM signal for transmission, the MCM signal comprising a plurality of data packets, wherein the plurality of data packets represent a plurality of amplitude values, wherein the plurality of amplitude values is characterized by a substantially Gaussian probability density function, the probability distribution transformer for transforming the plurality of amplitude values to a plurality of transformed amplitude values in accordance with a probability distribution transform, wherein the plurality of transformed amplitude values is characterized by a substantially uniform probability density function, and the probability distribution transformer having an output for providing a transformed MCM signal comprising a plurality of transformed data packets, wherein the plurality of transformed data packets represent at least some of the plurality of transformed amplitude values of the corresponding transformed MCM signal; and a MCM receiver comprising:

a probability distribution inverter having an input for receiving a corresponding transformed MCM signal, the probability distribution inverter for transforming the at least some of the plurality of transformed amplitude values to a plurality of inverted amplitude values in accordance with an inverse probability distribution transform, wherein the plurality of inverted amplitude values is characterized by a substantially Gaussian probability density function, and the probability distribution inverter having an output for providing a recovered MCM signal comprising a plurality of inverted data packets, wherein the plurality of inverted data packets represent at least some of the plurality of inverted amplitude values.

2. A PAPR reducer in accordance with claim 1, wherein the probability distribution transformer comprises a plurality of linear transformers for transforming the plurality of amplitude values to the plurality of transformed amplitude values.

3. A PAPR reducer in accordance with claim 2, wherein the plurality of linear transformers comprises at least one linear transformer for transforming a first predetermined band of amplitude values in accordance with the following equation:

$$y=(a/\sigma)x$$

where x is one of the plurality of amplitude values;
y is a corresponding one of the plurality of transformed amplitude values;
a is a predetermined constant; and
$\sigma$ is standard deviation of the plurality of amplitude values.

4. A PAPR reducer in accordance with claim 3, wherein the first predetermined band of amplitude values comprises $|x| \leq \sigma$.

5. A PAPR reducer in accordance with claim 2, wherein the plurality of linear transformers comprises at least one predetermined pair of linear transformers for transforming a corresponding pair of predetermined bands of amplitude values.

6. A PAPR reducer in accordance with claim 5, wherein the at least one predetermined pair of linear transformers and the corresponding pair of predetermined bands of amplitude values comprise:

$$y=(b/\sigma)x+c \text{ when } \sigma<x\leq2\sigma; \text{ and}$$

$$y=(b/\sigma)x-c \text{ when } -2\sigma\leq x<-\sigma;$$

where x is one of the plurality of amplitude values;
y is a corresponding one of the plurality of transformed amplitude values;
b and c are predetermined constants; and
$\sigma$ is standard deviation of the plurality of amplitude values.

7. A PAPR reducer in accordance with claim 5, wherein the at least one predetermined pair of linear transformers and the corresponding pair of predetermined bands of amplitude values comprise:

$$y=(d/\sigma)x+e \text{ when } 2\sigma<x\leq6\sigma; \text{ and}$$

$$y=(d/\sigma)x-e \text{ when } -6\sigma\leq x<-2\sigma;$$

where x is one of the plurality of amplitude values;
y is a corresponding one of the plurality of transformed amplitude values;
d and e are predetermined constants; and
$\sigma$ is standard deviation of the plurality of amplitude values.

8. A PAPR reducer in accordance with claim 5, wherein the at least one predetermined pair of linear transformers and the corresponding pair of predetermined bands of amplitude values comprise:

$$y=0.95 \text{ when } x>6\sigma; \text{ and}$$

$$y=-0.95 \text{ when } x<-6\sigma;$$

where x is one of the plurality of amplitude values;
y is a corresponding one of the plurality of transformed amplitude values; and
$\sigma$ is standard deviation of the plurality of amplitude values.

9. A PAPR reducer in accordance with claim 2, wherein the probability distribution inverter comprises a plurality of inverse linear transformers, wherein the plurality of inverse linear transformers are the inverse of the plurality of linear transformers, the plurality of inverse linear transformers for transforming at least some of the plurality of transformed amplitude values to at least some of the plurality of amplitude values.

10. A PAPR reducer in accordance with claim 1, wherein the probability distribution inverter comprises a plurality of linear transformers for transforming the plurality of transformed amplitude values to the plurality of inverted amplitude values.

11. A PAPR reducer in accordance with claim 10, wherein the plurality of linear transformers comprises at least one linear transformer for a first predetermined band of transformed amplitude values in accordance with the following equation:

$$s=(g\sigma)y$$

where y is one of the plurality of transformed amplitude values;
s is a corresponding one of the plurality of inverted amplitude values;
g is a predetermined constant; and
$\sigma$ is standard deviation of the plurality of transformed amplitude values.

12. A PAPR reducer in accordance with claim 11, wherein the first predetermined band of transformed amplitude values comprises $|y| \leq 0.4$.

13. A PAPR reducer in accordance with claim 10, wherein the plurality of linear transformers comprises at least one predetermined pair of linear transformers for a corresponding pair of predetermined bands of transformed amplitude values.

14. A PAPR reducer in accordance with claim 13, wherein the at least one predetermined pair of linear transformers and the corresponding pair of predetermined bands of transformed amplitude values comprise:

$$s=(\sigma/h)(y-z) \text{ when } 0.4<y\leq 0.55; \text{ and}$$

$$s=(\sigma/h)(y+i) \text{ when } -0.55\leq y<-0.4;$$

where y is one of the plurality of transformed amplitude values;
s is a corresponding one of the plurality of inverted amplitude values;
h and i are predetermined constants; and
$\sigma$ is standard deviation of the plurality of transformed amplitude values.

15. A PAPR reducer in accordance with claim 13, wherein the at least one predetermined pair of linear transformers and the corresponding pair of predetermined bands of transformed amplitude values comprise:

$$s=10\sigma(y-j) \text{ when } 0.55<y\leq 0.95; \text{ and}$$

$$s=10\sigma(y+j) \text{ when } -0.95\leq y<-0.55;$$

where y is one of the plurality of transformed amplitude values;
s is a corresponding one of the plurality of inverted amplitude values;
j is a predetermined constant; and
$\sigma$ is standard deviation of the plurality of transformed amplitude values.

16. A PAPR reducer in accordance with claim 13, wherein the at least one predetermined pair of linear transformers and the corresponding pair of predetermined bans of transformed amplitude values comprise:

$$s=6\sigma \text{ when } y<0.95; \text{ and}$$

$$s=-6\sigma \text{ when } y<-0.95;$$

where y is one of the plurality of transformed amplitude values;
s is a corresponding one of the plurality of inverted amplitude values; and
$\sigma$ is standard deviation of the plurality of transformed amplitude values.

17. A multi-carrier modulation (MCM) transmitter comprising:
a probability distribution transformer having an input for receiving an MCM signal for transmission, the MCM signal comprising a plurality of data packets, wherein the plurality of data packets represent a plurality of amplitude values, wherein the plurality of amplitude values is characterized by a substantially Gaussian probability density function, the probability distribution transformer for transforming the plurality of amplitude values to a plurality of transformed amplitude values in accordance with a probability distribution transform, wherein the plurality of transformed amplitude values is characterized by a substantially uniform probability density function, and the probability distribution transformer having an output for providing a transformed MCM signal comprising a plurality of transformed data packets, wherein the plurality of transformed data packets represent at least some of the plurality of transformed amplitude values.

18. A MCM transmitter in accordance with claim 17, wherein the probability distribution transformer comprises a plurality of linear transformers for transforming the plurality of amplitude values to the plurality of transformed amplitude values.

19. A MCM transmitter in accordance with claim 18, wherein the plurality of linear transformers comprises at least one linear transformer for a first predetermined band of amplitude values in accordance with the following equation:

$$y=(a/\sigma)x$$

where x is one of the plurality of amplitude values;
y is a corresponding one of the plurality of transformed amplitude values;
a is a predetermined constant; and
$\sigma$ is standard deviation of the plurality of amplitude values.

20. A MCM transmitter in accordance with claim 19, wherein the first predetermined band of amplitude values comprises $|x|\leq\sigma$.

21. A MCM transmitter in accordance with claim 18, wherein the plurality of linear transformers comprises at least one predetermined pair of linear transformers for a corresponding pair of predetermined bands of amplitude values.

22. A MCM transmitter in accordance with claim 21, wherein the at least one predetermined pair of linear transformers and the corresponding pair of predetermined bands of amplitude values comprise:

$$y=(b/\sigma)x+c \text{ when } \sigma<x\leq 2\sigma; \text{ and}$$

$$y=(b/\sigma)x-c \text{ when } -2\sigma\leq x<-\sigma;$$

where x is one of the plurality of amplitude values;
y is a corresponding one of the plurality of transformed amplitude values;
b and c are predetermined constants; and
$\sigma$ is standard deviation of the plurality of amplitude values.

23. A MCM transmitter in accordance with claim 21, wherein the at least one predetermined pair of linear transformers and the corresponding pair of predetermined bands of amplitude values comprise:

$$y=(d/\sigma)x+e \text{ when } 2\sigma<x\leq 6\sigma, \text{ and}$$

$$y=(d/\sigma)x-e \text{ when } -6\sigma\leq x<-2\sigma;$$

where x is one of the plurality of amplitude values;
y is a corresponding one of the plurality of transformed amplitude values;
d and e are predetermined constants; and
$\sigma$ is standard deviation of the plurality of amplitude values.

24. A MCM transmitter in accordance with claim 21, wherein the at least one predetermined pair of linear transformers and the corresponding pair of predetermined bands of amplitude values comprise:

$$y=0.95 \text{ when } x>6\sigma; \text{ and}$$

$$y=-0.95 \text{ when } x<-6\sigma;$$

where x is one of the plurality of amplitude values;
y is a corresponding one of the plurality of transformed amplitude values;
f is a predetermined constant; and σ is standard deviation of the plurality of amplitude values.

25. A multi-carrier modulation (MCM) receiver comprising:
a probability distribution inverter having an input for receiving a transformed MCM signal, wherein the transformed MCM signal comprises a plurality of transformed data packets, wherein the plurality of transformed data packets represent a plurality of transformed amplitude values, and wherein the plurality of transformed amplitude values is characterized by a substantially uniform probability density function, the probability distribution inverter for transforming at least some of the plurality of transformed amplitude values to a plurality of inverted amplitude values in accordance with an inverse probability distribution transform, wherein the plurality of inverted amplitude values is characterized by a substantially Gaussian probability density function, and the probability distribution inverter having an output for providing a recovered MCM signal comprising a plurality of inverted data packets, wherein the plurality of inverted data packets represent at least some of the plurality of inverted amplitude values.

26. A MCM receiver in accordance with claim 25, wherein the probability distribution inverter comprises a plurality of linear transformers for transforming the plurality of transformed amplitude values to the plurality of inverted amplitude values.

27. A MCM receiver in accordance with claim 26, wherein the plurality of linear transformers comprises at least one linear transformer for a first predetermined band of transformed amplitude values in accordance with the following equation:

$$s=(g\sigma)y$$

where y is one of the plurality of transformed amplitude values;
s is a corresponding one of the plurality of inverted amplitude values;
g is a predetermined constant; and
σ is standard deviation of the plurality of transformed amplitude values.

28. A MCM receiver in accordance with claim 27, wherein the first predetermined band of transformed amplitude values comprises |y|≤0.4.

29. A MCM receiver in accordance with claim 26, wherein the plurality of linear transformers comprises at least one predetermined pair of linear transformers for a corresponding pair of predetermined bands of transformed amplitude values.

30. A MCM receiver in accordance with claim 29, wherein the at least one predetermined pair of linear transformers and the corresponding pair of predetermined bans of transformed amplitude values comprise:

$$s=(\sigma/h)(y-i) \text{ when } 0.4<y\leq0.55; \text{ and}$$

$$s=(\sigma/h)(y+i) \text{ when } -0.55\leq y<-0.4;$$

where y is one of the plurality of transformed amplitude values;
s is a corresponding one of the plurality of inverted amplitude values;
h and i are predetermined constants; and
σ is standard deviation of the plurality of transformed amplitude values.

31. A MCM receiver in accordance with claim 29, wherein the at least one predetermined pair of linear transformers and the corresponding pair of predetermined bands of transformed amplitude values comprise:

$$s=10\sigma(y-j) \text{ when } 0.55<y\leq0.95; \text{ and}$$

$$s=10\sigma(y+j) \text{ when } -0.95\leq y<-0.55;$$

where y is one of the plurality of transformed amplitude values;
s is a corresponding one of the plurality of inverted amplitude values;
j is a predetermined constant; and
σ is standard deviation of the plurality of transformed amplitude values.

32. A MCM receiver in accordance with claim 29, wherein the at least one predetermined pair of linear transformers and the corresponding pair of predetermined bands of transformed amplitude values comprise:

$$s=6\sigma \text{ when } y>0.95; \text{ and}$$

$$s=-6\sigma \text{ when } y<-0.95;$$

where y is one of the plurality of transformed amplitude values;
s is a corresponding one of the plurality of inverted amplitude values; and
σ is standard deviation of the plurality of transformed amplitude values.

33. A method for peak to average power ratio reduction in a multi-carrier modulation (MCM) communication system comprising the steps of:
a) receiving a MCM signal for transmission, wherein the MCM signal comprises a plurality of data packets, wherein the plurality of data packets represent a plurality of amplitude values, and wherein the plurality of amplitude values is characterized by a substantially Gaussian probability density function;
b) transforming the plurality of amplitude values to a plurality of transformed amplitude values in accordance with a probability distribution transform, wherein the plurality of transformed amplitude values is characterized by a substantially uniform probability density function;
c) providing a transformed signal, wherein the transformed signal comprises a plurality of transformed data packets, wherein the plurality of transformed data packets represents at least some of the plurality of transformed amplitude values;
d) transmitting the transformed signal on a communication channel of the MCM communication system;
e) receiving the transformed signal on the communication channel;
f) transforming the at least some of the plurality of transformed amplitude values to a plurality of inverted amplitude values in accordance with an inverse probability distribution transform, wherein the plurality of inverted amplitude values is characterized by a substantially Gaussian distribution; and
g) providing an inverted signal, wherein the inverted signal comprises a plurality of inverted data packets, wherein the plurality of inverted data packets represents some of the plurality of inverted amplitude values.

34. A method in accordance with claim 33, wherein step (b) comprises the step of applying a plurality of linear transforms.

35. A method in accordance with claim 34, wherein step (f) comprises the step of applying a plurality inverse linear transforms, wherein the plurality of inverse linear transforms are the inverse of the plurality of linear transforms.

* * * * *